Sept. 9, 1924.                                            1,507,771
W. FERRIS
BROACH CLEANER
Filed June 8, 1922                    2 Sheets-Sheet 1

INVENTOR:
WALTER FERRIS
BY Ralph W Brown
ATTORNEY.

Sept. 9, 1924.  
W. FERRIS  
BROACH CLEANER  
Filed June 8, 1922

INVENTOR:
WALTER FERRIS
BY
Ralph W. Brown,
ATTORNEY.

Patented Sept. 9, 1924.

1,507,771

UNITED STATES PATENT OFFICE.

WALTER FERRIS, OF MILWAUKEE, WISCONSIN, ASSIGNOR TO THE OIL GEAR COMPANY, OF MILWAUKEE, WISCONSIN, A CORPORATION OF WISCONSIN.

BROACH CLEANER.

Application filed June 8, 1922. Serial No. 566,777.

*To all whom it may concern:*

Be it known that I, WALTER FERRIS, a citizen of the United States, residing at Milwaukee, in the county of Milwaukee and State of Wisconsin, have invented a certain new and useful Improvement in Broach Cleaners, of which the following is a full, clear, concise, and exact description, reference being had to the accompanying drawings, forming a part of this specification.

This invention relates to the art of broaching and, particularly, to the cleaning of broaching tools.

The proper functioning of a broaching tool requires that it be kept clean and free from the chips of material which are ordinarily produced during broaching operations. These chips, which usually occur in curled form, adhere to the teeth of the tool with such tenacity as to appear to be partially welded thereto, so that some difficulty has been experienced in effecting their removal. In fact, this has heretofore been accomplished only by a special manipulation or operation upon the tool requiring the withdrawal of the tool from the machine after each working cycle.

One object of the present invention is the provision of an improved method and means for effecting the complete removal of these chips from a broaching tool.

Another object is the provision of an attachment for broaching machines, by which the removal of the chips may be automatically effected during the stroke of the tool, thus avoiding the necessity of withdrawing the tool from the machine for this purpose.

Other objects and advantages will hereinafter appear.

Two embodiments of the present invention are illustrated in the accompanying drawings, in which.

Figure 4:
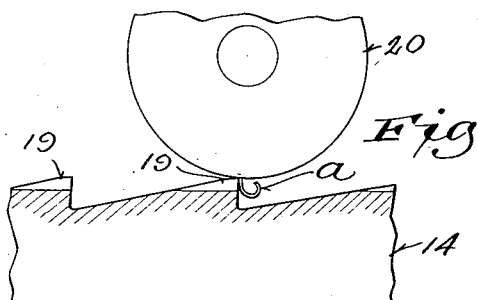
Figure 4 is a diagrammatic view illustrating the action of a chip removing roller.
Figure 5:
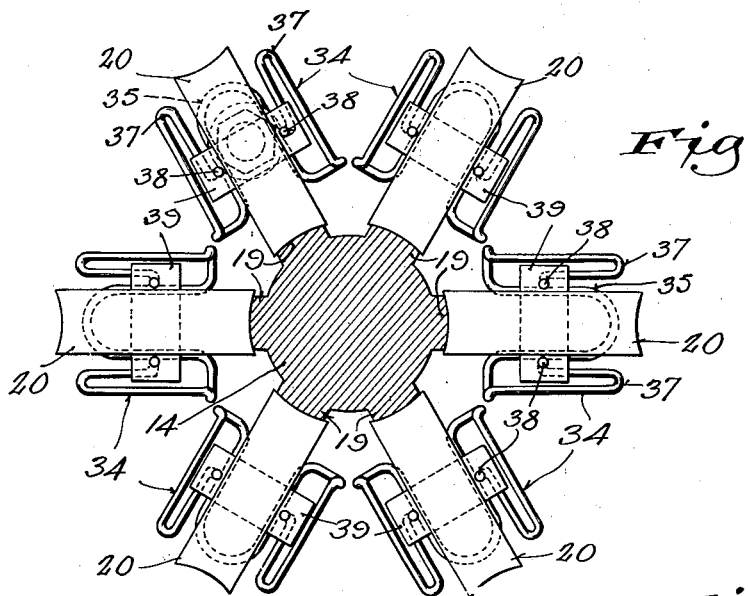
Figure 5 is a view similar to Figure 3 illustrating a broach cleaning attachment of somewhat different form.
Figure 7:
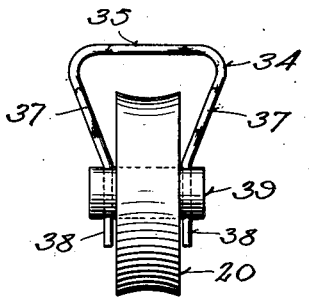
Figure 7 is a plan view of the element shown in Figure 6.
Figure 6:
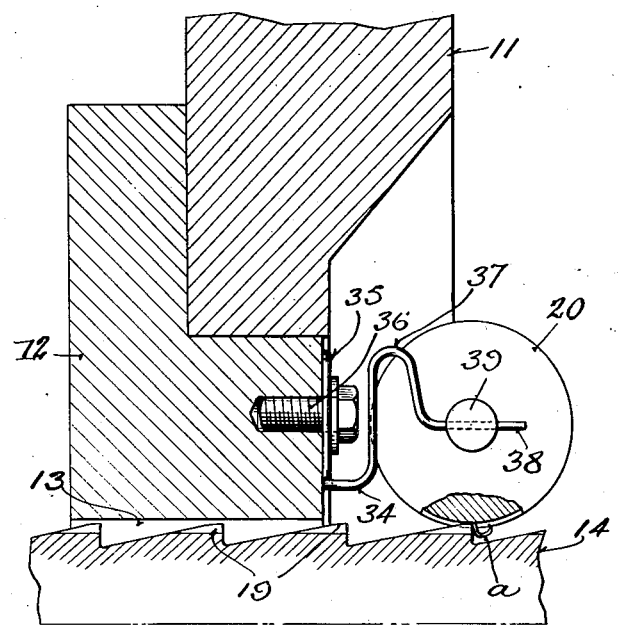
Figure 6 is a side elevational view of one of the cleaning elements shown in Figure 5 applied to a broaching machine.

During the working or cutting stroke of a broach, each of the teeth thereof produces a curled chip, such as indicated at $a$ in Figure 4. These chips closely adhere to the lips of the teeth with such firmness that considerable force is frequently required to loosen them. I have found, however, that loosening of the chips can invariably be effected by a firm pressure or light blow applied to the outer end or base of each chip where it is substantially flush with the cutting edge of the tooth. Although application of this pressure or blow may be accomplished in various ways, I have found that a roller is well adapted for the purpose. For instance, I have discovered that by passing a roller, under light spring pressure, along the broach so as to contact with successive teeth thereof, the chips are effectively loosened from the teeth so engaged. This is no doubt due, not alone to the pressure of contact, but also to the slight impact which occurs as the roller strikes each tooth.

Figure 1:
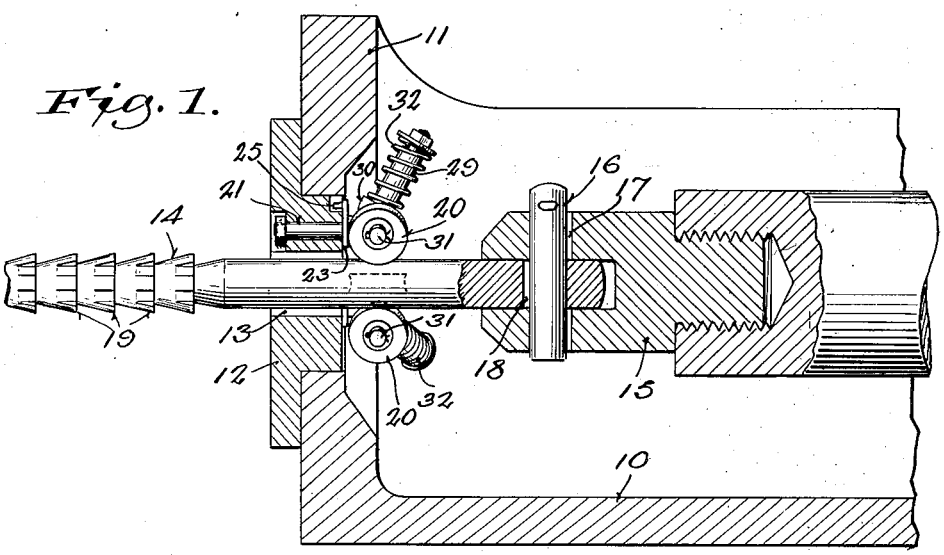
Figure 1 is a sectional view of a portion of a broaching machine having applied thereto a broach cleaning attachment constructed in accordance with the present invention.
Figure 2:
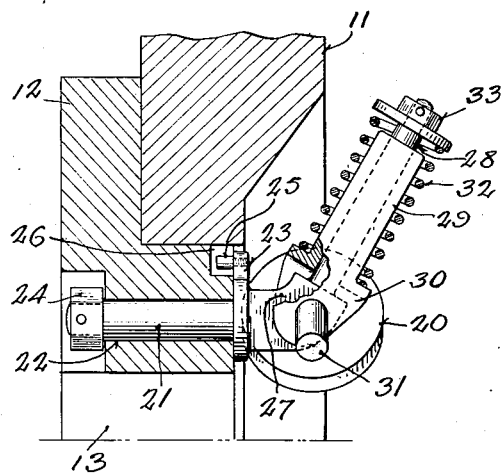
Figure 2 is a sectional view, on a somewhat larger scale, of a broach cleaning unit shown in Figure 1.
Figure 3:
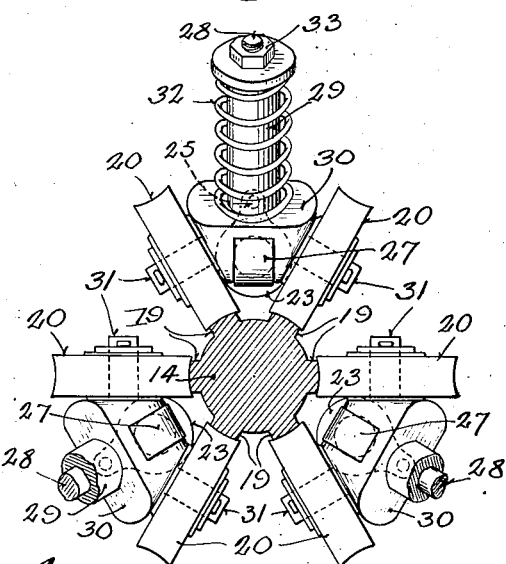
Figure 3 is an elevation of a broach cleaning attachment as it would appear looking from right to left in Figure 1.

Figures 1 to 3 are illustrative of a practical embodiment of the present invention as applied to a horizontal type of broaching machine of well known construction. The bed or trough of the machine, shown at 10 in Figure 1, is provided at one end with the usual face plate 11 fashioned to receive the usual bushing 12 having a central opening 13 through which the broach 14 travels during the working and return strokes. The broach is reciprocated by the usual drawhead 15 to which it is removably connected through a key 16 extending through slots 17 and 18 in the drawhead and nose of the broach, respectively. The broach selected for illustration is a six spline broach having the usual six equally spaced rows of teeth 19 extending longitudinally thereof.

A circular series of broach cleaning rollers 20 are mounted upon the bushing 12 for contacting engagement with the teeth of the broach as it is reciprocated through the opening 13. In this instance, six rollers are employed, one for each row of teeth. These rollers are mounted in pairs upon three angle brackets, each having a cylindrical shank or stem 21 swiveled in an appropriate opening 22 in the bushing 12. The stem 21 of each bracket is provided at one end with a collar 23 bearing against the inner face of the bushing, the other end being threaded to receive a nut 24 or other appropriate securing means. The angular movement of the bracket about the axis of the stem 21 is limited by a pin 25 carried by the collar 23 and engaging in a recess 26 in the inner face of the bushing. The stem of each bracket also carries a flat sided head 27, preferably formed integral therewith and terminating in a cylindrical shank 28 extending away from the broaching tool in a plane substantially radially thereof. The shank 28 of each bracket carries a sleeve portion 29 slidably mounted thereon and provided with a bifurcated head 30 which fits closely but freely over the flat sides of the head 27. The bifurcated head 30 is provided with a pair of projecting gudgeons 31 upon which the pair of rollers 20 are journaled. A coiled spring 32 between the bifurcated head and a nut 33 on the end of the shank 28 forces this head and consequently the rollers toward and against the broaching tool. Thus it will be clear that as the tool is drawn through the opening in the bushing and between the rollers, each roller will jump from tooth to tooth of its corresponding row of teeth and consequently apply a firm pressure or light blow to any chip adhering thereto. The rollers are made of mild steel or of any other appropriate material of sufficient softness to avoid injury to the cutting edges of the teeth and of sufficient weight to effect the desired impact.

Figure 8:
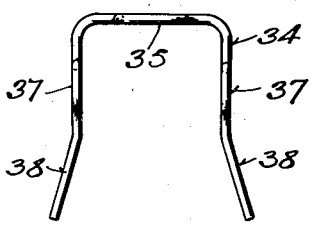
Figure 8 is a plan view of the resilient mounting for a cleaning roller.

In the embodiment of the invention illustrated in Figures 5 to 8, each roller 20 is provided with an individual spring mounting. Each mounting, in the form shown, comprises a wire 34 of spring steel bent to provide an intermediate loop portion 35 shaped to receive the shank of a screw 36 by which it is secured in position against the inner face of the bushing 12. From the open end of the loop the wire extends laterally in opposite directions, then forwardly away from the bushing, then upwardly and downwardly (Fig. 6) to form two substantially parallel spaced loops 37, the end portions 38 normally assuming a divergent condition, such as indicated in Figure 8. Each roller 20 is mounted on a stub shaft 39 transversely perforated at its ends to receive the end portions 38.

In assembling the shaft 39 upon the end portions 38, the end portions are drawn together sufficiently to register with the perforations in the shaft and then inserted therein. The frictional engagement of the end portion 38 within the perforations of the shaft 39, due to the tendency of the end portion 38 to spring apart, is sufficient to retain the shaft thereon without other fastening means.

In use, a circular series of rollers 20 is mounted upon the inner face of the bushing 12 about the opening 13, each spring mounting 34 being so arranged as to yieldably force its individual roller into the path of travel of the broach. Thus during travel of the broach through opening 13, each row of cutting teeth is engaged by a roller which, under the spring pressure of its resilient mounting, jumps from tooth to tooth and consequently applies a firm pressure or light blow to any chips adhering thereto.

Various changes may be made in either of the embodiments of the invention hereinabove specifically described, without departing from or sacrificing any of the advantages of the invention as defined in the appended claims.

I claim:

1. In a broaching machine the combination of a broach, broach reciprocating means and means mounted adjacent the path of travel of the broach for removing chips therefrom during the reciprocation thereof.

2. In a broaching machine the combination of a broach, broach reciprocating means, a broach cleaning roller, and means for mounting said roller adjacent the path of travel of the broach to contact with the successive teeth thereof during such reciprocation.

3. In a broaching machine the combination of a broach, broach reciprocating means, a broach cleaning roller, and a yieldable support for said roller constructed and arranged to press said roller against the teeth of the broach during reciprocation thereof.

4. In a broaching machine the combination of a broach, broach reciprocating means, an impact element for contacting with the ends of the broach teeth during reciprocation thereof, and yielding means for maintaining such contact.

5. In a device for removing chips from the teeth of a broach, the combination with a broach, of a series of rollers, means for effecting a relative movement between said rollers and broach through said series, and means for causing said rollers to yieldably contact with successive teeth of the broach during such movement.

6. A broach cleaning attachment for broaching machines having a face plate and a broach reciprocating therethrough, said attachment comprising a bushing for mounting in the face plate of the machine, and broach contacting means carried by said bushing for cleaning the broach during its travel therethrough.

7. A broach cleaning attachment for broaching machines having a face plate and a broach reciprocating therethrough, said attachment comprising an element for mounting upon the face plate of the machine, a roller carried by said element, and means for causing said roller to yieldably contact with the teeth of the broach during its travel through the face plate.

8. A broach cleaning attachment for broaching machines having a face plate and a broach reciprocating therethrough, said attachment comprising an element for mounting upon the face plate of the machine, a series of rollers carried by said element, and means for causing said rollers to yieldably contact with the teeth of the broach during its travel through the face plate.

9. In a device for cleaning broaches the combination with a broach, of a support, a circular series of impact elements, and resilient means for mounting said elements on said support to cause said elements to yieldably contact with the teeth of the broach drawn therethrough.

In witness whereof, I hereunto subscribe my name this 2d day of June, 1922.

WALTER FERRIS.